United States Patent [19]

Witzel

[11] Patent Number: 5,054,086
[45] Date of Patent: Oct. 1, 1991

[54] BINARY SYSTEM FOR GENERATING SOUND

[76] Inventor: Steven L. Witzel, 4101 E. Canyon View Pl., Sandy, Utah 84092

[21] Appl. No.: 352,194

[22] Filed: May 16, 1989

[51] Int. Cl.$^5$ .............................................. G10L 5/00
[52] U.S. Cl. ..................................... 381/51; 341/169; 364/513.5
[58] Field of Search ..................................... 381/51-53, 381/29; 341/169; 364/513.5

[56] References Cited

U.S. PATENT DOCUMENTS

| | | | |
|---|---|---|---|
| 3,816,660 | 6/1974 | Nishiyama | 381/51 |
| 4,387,269 | 6/1983 | Hashimoto et al. | 381/51 |
| 4,559,602 | 12/1985 | Bates | 381/36 |
| 4,700,362 | 10/1987 | Todd | 381/29 |

Primary Examiner—Emanuel S. Kemeny
Attorney, Agent, or Firm—Thorpe North & Western

[57] ABSTRACT

In a binary system for generating sound, digital signals representing an audio analog signal are stored in memory, a first voltage level is produced for a time $t_1$ proportional to the value of a respective stored digital signal, and a second voltage level is produced for a time $t_2 = t_c - t_1$, where $t_c$ is a fixed clock signal time interval. The first and second voltage levels are successively supplied to a speaker to operate the speaker in a type of frequency modulated mode to produce sound corresponding to the audio analog signal.

5 Claims, 1 Drawing Sheet

BINARY SYSTEM FOR GENERATING SOUND

BACKGROUND OF THE INVENTION

This invention relates to a method and apparatus for producing sound utilizing binary signals.

Most computer systems include a speaker typically driven by binary signals for the purpose of generating beeps, buzzes, clicks and similar sounds for alerting the user about certain conditions in the system. High quality sound, however, such as voice music, sound effects, and the like, cannot be produced on computer systems unless they are equipped with some type of analog signal generating apparatus capable of producing analog audio signals. Such signals would typically be amplitude modulated with the sound information which was to be produced and the signals would be supplied to a conventional speaker to operate the speaker and produce the desired sound. However, provision of such special sound producing apparatus could be costly, possibly making it undesirable at least to certain users. On the other hand, a computer system having the capability of producing high quality sound, without the attendant additional cost, would be desirable and attractive to almost all users since an additional dimension of use of the system would be available.

SUMMARY OF THE INVENTION

It is an object of the present invention to provide a method and apparatus for producing high quality sound in a conventional digital computer system equipped with a speaker.

It is also an object of the invention to provide a system for producing high quality sound with binary signals.

It is a further object of the invention to provide such a system for reproducing high quality sound either from digital data obtained from sampling analog audio signals or from synthesized digital data.

The above and other objects of the invention are realized in a specific illustrative embodiment of a system for generating sound in a binary system which has the capability of producing first and second voltage levels and which has a speaker. The system includes the steps of storing in memory digital signals representing an audio analog signal, said digital. signals being obtained either from sampling or synthesizing, producing clock signals having a period $t_c$, producing the first voltage level for a time $t_1$ proportional to the value of a respective stored digital signal, and producing the second voltage level for a time $t_2 = t_c - t_1$. The first and second voltage levels are successively supplied to the speaker to operate the speaker causing it to produce sound corresponding to the audio analog signal. In effect, the position of the speaker cone is controlled, not with the normal amplitude modulated signal, but with a time-domain or pulse interval modulated signal.

The above described system embodiment may be implemented using either software or hardware, or a combination of the two. An illustrative embodiment of the hardware implementation includes a clock for generating timing signals having a predetermined frequency and interval which are at least twice the frequency of an analog audio signal to be "converted", a memory for storing signals having values representing sounds to be generated, a speaker responsive to drive signals for producing the sound, and a driver circuit responsive to bi-level sound information signals for supplying drive signals to the speaker. A bi-level voltage generating circuit is coupled to the memory and the clock for successively supplying to the driver a first voltage level which subsists for a time proportional to the value of a respective signal stored in memory, and a second voltage level which subsists for a time proportional to the timing signal interval less the time duration of the first level. Thus, a two-level signal is supplied to the driver where the time duration of each level varies in accordance with stored signals, but with the total time of duration of the first and second levels being constant. In this manner, the direction of movement of the speaker cone is controlled by the time duration of the signal levels of a binary input.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
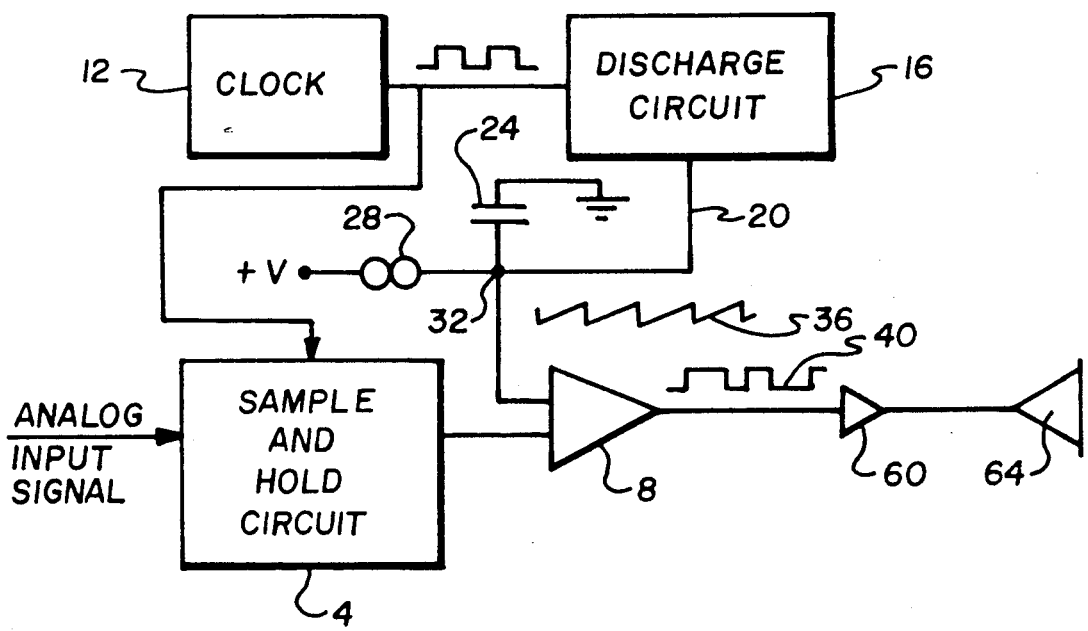
FIG. 1 shows a hardware implementation of a binary system for generating sound, made in accordance with the principles of the present invention.

FIG. 1 shows one illustrative embodiment of a binary system for generating sound in accordance with the present invention. This system includes a sample and hold circuit 4 for receiving and sampling an analog audio input signal carrying sound information. The sampled values of the signal, represented by different amplitudes, are stored by the circuit 4 for ultimate supply to a comparator circuit 8. The sampling of the input signal by the circuit 4 is carried out in synchronization with a clock signal supplied by a clock 12.

The clock signal is also supplied by the clock 12 to a discharge circuit 16 which, in response to the leading edge of each clock pulse (i.e., once every clock cycle), places a ground potential on a lead 20 which discharges a capacitor 24. Immediately following grounding of the lead 20 and discharge of the capacitor 24, the discharge circuit 16 removes the ground from the lead to allow the capacitor to begin charging from a constant current source 28. This charging continues in a linearly increasing fashion until the next clock pulse causes the discharge circuit 16 to discharge the capacitor 24. The resultant waveform developed at the node 32 is a ramp function as illustrated at 36.

Figure 2:
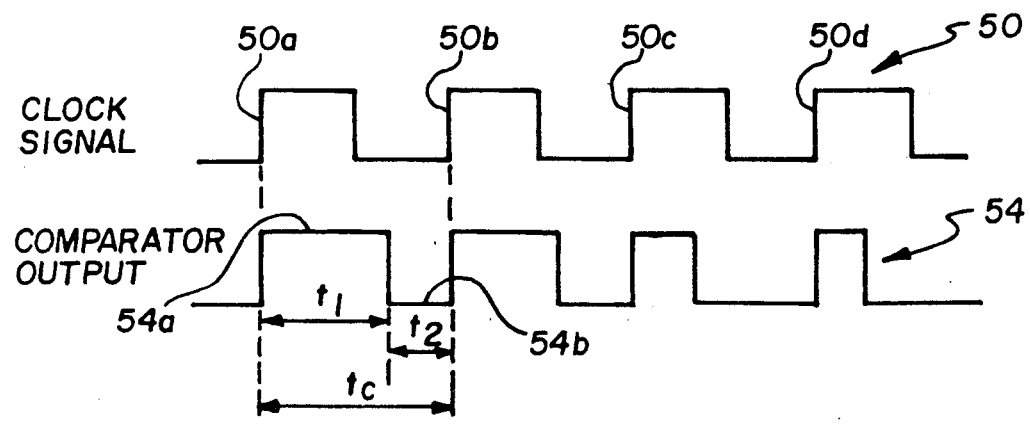
FIG. 2 shows graphically a clock signal sequence for the system of FIG. 1 and a variable two-level time domain signal juxtaposed thereunder.

The node 32 is coupled to the comparator 8 which compares the input level from the node with the successively supplied sampled values from the sample and hold circuit 4 to produce a varying two-level ("high" and "low") time domain signal represented at 40. The sample and hold circuit 4, in response to the clock signal supplied by the clock 12, supplies a new sampled value to the comparator 8 at the beginning of each clock pulse, i.e., at the same time that the capacitor 24 begins to charge. The output from the comparator 8 is at the high level so long as the voltage level at the node 32 is less than the value of the sample being supplied by the sample and hold circuit 4. As soon as the ramp voltage at the node 32 matches the level of the sampled values supplied by the circuit 4, the output from the comparator 8 goes low and stays low until the capacitor 24 is discharged with the next clock pulse so that the voltage at the node 32 goes back to zero. The output from the comparator 8 thus consists of a two-level signal where the high level persists for a period of time proportional to a sampled signal value supplied by the sample and hold circuit 4, and the low level persists for a time equal to the clock signal period minus the time of persistance of the high level. This is illustrated in FIG. 2 which shows a sequence of clock signals 50 and an illustrative comparator 8 output 54. As mentioned earlier, the comparator output goes high at the beginning of each clock pulse, such beginnings shown at 50a, 50b, 50c and 50d. At the beginning of each of those pulses, note that the comparator output signal 54 assumes the high level. One such high level 54a persists for a period of time $t_1$ or until the ramp voltage developed at node 32 matches the output of the sample and hold circuit 40. The output of the comparator then assumes the low level 54b for a time $t_2$ which equals the clock period $t_c$ minus $t_1$. A succession of high level signals followed by low level signals are produced by the comparator 8 as successive sampled values are supplied by the sample and hold circuit 4 to the comparator.

The output of the comparator is supplied to a driver 60 which in turn drives a conventional speaker 64 to produce sound. In effect, the cone of the speaker 64 is caused to move back and forth in response to changes in the output level of the driver 60, i.e., changes in output level of the comparator 8, to produce the desired sound. The frequency of the change of direction of the cone varies in response to the time-domain input signal so that the speaker is frequency modulated (frequency of oscillation of the cone) and this is equivalent to the usual amplitude modulation which would occur if the analog input signal were provided directly to the speaker. In this manner, sound information contained in the amplitude variation of an analog signal is represented by a binary signal whose high level persists for a time proportional to the amplitude of samples taken of the analog signal.

The system of the present invention could also be implemented on a computer system which utilizes an MS DOS operating system, where the digital values representing sampled amplitude values of an analog audio signal are stored in memory. The computer system converts the digital representations stored in memory to binary signals whose time intervals are proportional to the stored digital values, as discussed above. These binary signals are supplied to the computer system's speaker to drive the speaker in the manner also discussed above.

An exemplary algorithm for developing sound on all DTK DATA 1000 computers pursuant to the present invention is set out below:

1. Initialize circuitry which provides input to computer system speaker;
2. Load computer system memory with table of digital data representing analog waveform of sound information to be produced;
3. Establish interrupt timing system by which computer system's program will be informed at the beginning of each clock interval—the program may carry out other operations so that it needs to be interrupted to perform the sound producing function only at the start of each clock interval and also when the level of the binary signal is to change;
4. At the beginning of each clock interval, retrieve from the data table the next digital value to be processed and set the input level to the computer system's speaker to a "one" level;
5. At the expiration of a time period proportional to the digital value retrieved in step 4 above, lower the input level to the speaker to a "zero";
6. At the beginning of next clock interval, return to step 4; and
7. Exit when no more values are present in the data table (or after some fixed time period).

It should be noted that steps 4 and 5 of the above algorithm could be replaced by steps involving the loading of a speaker control timer with successive values from the data table, assuming the computer system was so equipped with a speaker control timer as is IBM compatible equipment.

It is to be understood that the above-described arrangements re only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a computer system having a speaker responsive to drive signals for producing sound and a driver means responsive to sound information signals for supplying drive signals to the speaker, a sound generation system comprising
   means for periodically sampling the amplitudes of an analog electrical signal representing sounds to be generated,
   means for storing digital signals having values representing the sampled amplitudes,
   means for generating timing signals having a predetermined frequency and interval, said timing signal generating means including clock means for producing a series of clock pulses, and means for developing ramp signals, each beginning in response to a clock pulse and ending upon the occurrence of the next clock pulse, and
   means coupled to the storing means and timing signal generating means for supplying a two-level electrical sound information signal to the driver means, with a first level subsisting for a time proportional to the value of a respective stored signal relative to the ramp signals, and a second level subsisting for a time proportional to the timing signal interval less the time duration of the first level.

2. A sound generation system as in claim 1 wherein said timing signal generating means further comprises
   a source of electrical current,
   a capacitor means coupled to the current source for charging at a substantially constant rate, and
   means coupled to the clock means for discharging the capacitor means each time a clock pulse is produced.

3. A sound generation system as in claim 2 wherein said signal supplying means includes means for comparing the charge level of the capacitor means with the values of the stored signal, for producing the first level during the time the value of a respective stored signal is less than the charge on the capacitor means, and for producing the second level during the time the value of a respective stored signal is equal to or greater than the charge on the capacitor means.

4. A sound generation system as in claim 1 wherein said signal supplying means includes means for producing the first level during the time each ramp signal is less tan the value of a respective stored signal, and for producing the second level during the time each ramp signal is equal to or greater than the value of a respective stored signal.

5. A method of generating sound in a binary computer system capable of producing first and second voltage levels and having a speaker, comprising the steps of converting an analog audio signal into a plurality of corresponding digital signals, storing in memory the digital signals whose values represent sampled amplitudes of the audio analog signal, periodically developing ramp signals, producing the first voltage level for a time $t_1$, proportional to the value of a respective stored digital signal, said time $t_1$ being determined as the time each ramp signal is less than the value of a respective stored signal, producing the second voltage level for a time $t_1 = t_c - t_1$, where $t_c$ is a fixed clock signal time interval equal to the time interval between generation of ramp signals, and successively supplying the first and second levels to the speaker to operate the speaker and produce sound corresponding to the audio analog signal.

* * * * *